May 10, 1932.  S. HAUSMAN ET AL  1,857,452
RATIO METER
Filed Jan. 12, 1929
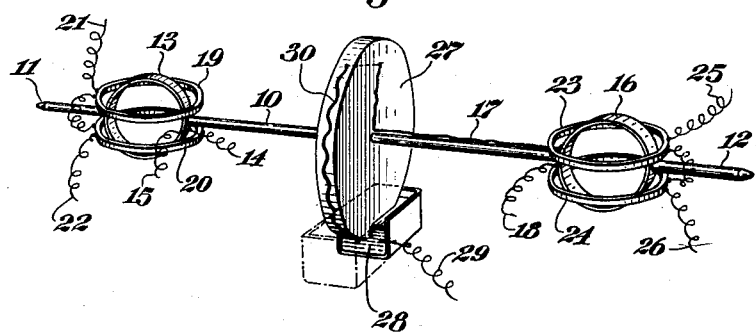
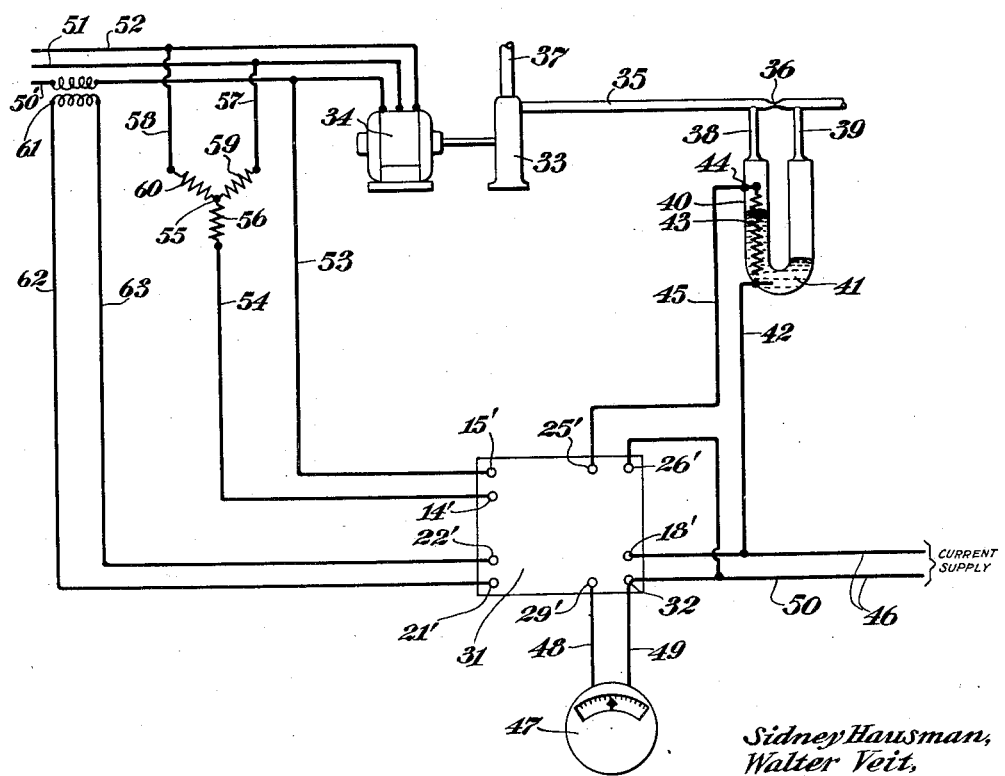
Sidney Hausman,
Walter Veit,
INVENTORS
BY
Frederick Breitenfeld
ATTORNEY Patented May 10, 1932

1,857,452

UNITED STATES PATENT OFFICE

SIDNEY HAUSMAN, OF ARLINGTON, NEW JERSEY, AND WALTER VEIT, OF NEW YORK, N. Y.

RATIO METER

Application filed January 12, 1929. Serial No. 332,109.

Our present innvention relates generally to metering devices, and has particular reference to an electrical metering device designed to register ratios.

Our invention is of a character wherein recourse is had to the electrical principle whereby the mutual effect of two cooperating magnetic fluxes is proportional to the product of such fluxes.

It is a general object of our present invention to provide a metering device of this general character wherein this principle is to a certain extent resorted to, but wherein it is coupled with a further wellknown mathematical principle which enables us to provide an extremely efficient instrument having a wide applicability.

As pointed out in considerable detail in the foregoing co-pending application, the general nature of the contemplated type of device can best be set forth by referring to its employment with a machine, the latter term being used in its broadest sense. It is a general object of our invention to provide a meter which may be used for continuously registering, indicating, or recording the ratio between two variable factors of operation of a machine. For instance, our meter may be employed for continuously measuring the ratio of output to input of a machine.

Although the applicability of our invention is extremely wide, as will be obvious from the foregoing, we have herein illustrated and shall hereinafter describe the same as applied to a specific machine and for a specific purpose, but it will be understood that this limited description is offered merely as an illustration of the capability of our device and of the general nature of our invention.

In accordance with our present invention, we have resorted to the algebraic truth that where $a = bx$ then $x$ is a measure of the ratio of $a$ to $b$. We have adopted this principle by making $a$ a force operating upon a movable member, and by making $bx$ a counterforce acting upon the same member. The first force we make proportional to one of the two factors whose ratio is to be measured. The force $bx$ is caused to be created by the product of the two factors $b$ and $x$, where $b$ is caused to be proportional to the other factor of the two whose ratio is desired, and $x$ is a variable and measurable factor. Thus, by properly varying $x$ in a predetermined manner, the two opposed forces are made to neutralize each other, thus establishing the equality; and by thereupon measuring $x$, we obtain a measure of the ratio between $a$ and $b$.

One of the features of our invention lies in harnessing the above algebraic principle to the contemplated purposes outlined above.

Another feature of our invention lies in causing the variation of the factor $x$ to be effected automatically by the resultant force created upon the movable member by the two opposed forces. In this way, our device, when properly hooked up with a machine, is entirely self-operating and constantly ready for registering or recording the desired ratio.

More specifically, it is a feature of our invention to provide $x$ in the form of a variable and measurable suppply of independent energy, such as electrical current, whereby the mere measurement of such current will serve as a measure of the desired ratio.

A further feature lies in creating the force $bx$ by means of the electrical principle hereinbefore mentioned, i. e., by allowing two currents to produce corresponding magnetic fluxes and to arrange for the mutual coaction of such fluxes. Thus, one electrical current is made proportional to one of the factors of operation, and the other electrical current is the variable supply of energy represented by $x$ and previously mentioned. By providing a pair of cooperably arranged inductance coils wherein said currents respectively flow, and by allowing said coils to react with each other, as by fixing one and rendering the other movable, we are enabled to provide the force above represented by the product $bx$.

The force $a$ which is proportional to the other factor of operation is preferably, though not necessarily, produced in a somewhat similar manner by allowing two inductance coils to react with each other. Where the factor of operation is of such a nature that a current may feasibly be made proportional thereto, then the force $a$ may satisfactorily be produced by employing two inductance coils, one of which is fixed, and the other of which is movable. Through one of these inductance coils we pass a constant current and through the other we pass the current which has been made proportional to the factor of operation. The resultant force or torque produced by the coaction of these two inductance coils will obviously be itself proportional to the factor mentioned. In other cases, where the factor involved is itself of a character whereby it is the resultant of two coacting sub-factors, we may produce the desired force $a$ by passing through two coactively arranged inductance coils two currents which are respectively proportional to such sub-factors. It is an arrangement of the latter character which is hereinafter specifically described.

In general, it is an object of our invention to provide a device which is substantially electrical in nature and which may be constructed in an efficient and compact manner similar to well-known electrical measuring devices or meters, such device thereby taking its place along with the vast number of other electrical measuring devices which are known to the art.

The foregoing general objects and features, and such other objects and features as may hereinafter appear or be pointed out will be more fully appreciated after this specification has been read, and for the purpose of explaining the nature of our invention in greater detail we have illustrated one embodiment thereof in the accompanying drawings, wherein—

Figure 1 is a perspective view of certain vital portions of an instrument or meter embodying the features of our invention; and Figure 2 is a diagrammatic representation of the manner whereby our meter may be employed in connection with a specific machine.

The apparatus of Figure 1 is preferably mounted within a suitable casing similar to the casings used in connection with electrical measuring devices of well-known character. Such casing is not illustrated, nor are auxiliary supporting elements which may be provided wherever necessary and require nothing more than mechanical skill in order that a compact instrument may be provided.

In the form illustrated, the movable member hereinbefore referred to is constituted of a rotatable spindle 10 which is suitably journaled at its opposite ends 11 and 12 or elsewhere along its axis. Carried by one portion of the spindle is an inductance coil 13 provided with the leads 14 and 15. Similarly carried by the spindle 10 at a spaced point along its axis is the inductance coil 16 provided with the leads 17 and 18. The coils 13 and 16 are mounted so as to rotate with the spindle 10.

The coil 13 is mounted in cooperative relationship to a fixed or stationary inductance coil which we have shown constituted of two parts 19 and 20, but these two parts are in essence a single inductance coil, which coil is provided with the leads 21 and 22. Similarly mounted in operative association with the movable coil 16 is a stationary coil constituted of the two parts 23 and 24 and provided with the leads 25 and 26.

Mounted on the spindle 10 for rotation therewith is a disc or wheel 27 having its lower portion immersed in a mercury well 28, the latter being in constant electrical connection with a lead 29. The lead 17 previously mentioned is suitably guided along the spindle 10 and mounted in association with the wheel 27 so that an exposed portion thereof 30 is arranged circumferentially around the peripheral surface of the wheel 27. Although we have shown only one wire at 30, it is pointed out that the portion 30 constitutes a resistance and accordingly one or more wires of suitable character and arrangement may be employed.

By virtue of the passage of the lower portion of the wheel 27 through the mercury well 28, it will be obvious that the angular position of the disc 27 (and of the spindle 10) will determine the amount of resistance operatively interposed in the circuit portion extending from the lead 29 through the portion 30, the lead 17, the movable coil 16, and the lead 18.

Before describing the specific method of applying our invention to the specific machine illustrated in Figure 2, we will point out in a general way how the features hereinbefore referred to are carried into effect by means of the apparatus illustrated in Figure 1.

The spindle 10 is the movable member to which two forces (in this case torques) are applied. The force $a$ is applied by means of the movable coil 13 and its cooperably arranged fixed coil. Where the variations of one factor of operation are transformable into variations of an electrical current, such current may, for example, be made to pass through the coil 13, and at the same time a fixed current would be made to pass through the stationary coil via the leads 21 and 22. As a result of such arrangement, a torque will be exerted upon the spindle 10 proportional to the factor of operation.

The counter-torque hereinbefore referred to as the product of $bx$ is applied to the spindle 10 by means of the coil 16 and its cooperatively arranged stationary coil. The variations of the second factor of operation are transformed into variations of an electrical current which is passed through the stationary coil 23—24 via the leads 25 and 26. At the same time, an electrical current is passed through the movable coil 16 by suitably connecting the leads 18 and 29 in the circuit.

Under the joint action of the two countertorques, the spindle 10 will rotate in one or the other direction, and by suitably designing the resistance 30 this rotation will not be very extensive. It will, however, place more or less of the resistance 30 in the circuit of the movable coil 16, and the current in such coil will therefore be automatically altered. Such automatic alteration continues to take place until the two torques acting upon the spindle 10 are exactly equal, at which time, obviously, the wheel 27 will come to rest. At such time, the equality $a=bx$ will have been established and a measurement of $x$, which in this case constitutes a measurement of the current flowing through the coil 16, will be an immediate measurement of the ratio between the two factors of operation.

In Figure 2 we have shown our ratio meter in the form of a box 31, and this box is meant diagrammatically to represent the casing within which the apparatus of Figure 1 is suitably mounted. We have shown eight terminals or binding posts to which the eight leads referred to in Figure 1 are suitably connected within the device. To facilitate a full understanding of the invention, the eight terminals of Figure 2 have been numbered in a manner which corresponds to the numbering of the leads in Figure 1. Thus, we have illustrated the eight terminals 25', 26', 18', 29', 21', 22', 14', and 15'. The terminal 32 is merely provided for the sake of convenience, as will be presently pointed out.

In Figure 2 we have shown a turbo-generator wherein a steam turbine 33 is associated with a three-phase generator 34. Our instrument has been associated with this arrangement for the purpose of measuring the water rate or pounds of steam consumed per kilowatt hour output.

The steam supply is fed to the turbine 33 through the pipe 35 in which we have provided a constriction 36. The exhaust steam leaves the turbine through the pipe 37. Leading from opposite sides of the constriction 36 are two small pipes or conduits 38 and 39 which lead respectively to the opposite arms of a U tube 40. In the latter we have shown a supply of mercury 41 in constant electrical connection with a lead 42. In one leg of the U tube 40 we have shown a suitable resistance 43 which extends from a relatively low point within the mercury 41 to the terminal 44 constantly connected with the lead 45. The passage of the steam past the constriction 36 will create different pressures on opposite sides of the constriction, and as a result, we observe the mercury 41 standing higher in the left leg of the U tube 40 than in the right leg. The difference in height between the two mercury columns will always be proportional to the difference in steam flow. Accordingly, by connecting the leads 42 and 45 with an electric circuit leading from a source of supply 46 and extending through the coil 23—24, the current in this circuit will be made to vary proportionately to the variations of steam flow.

The same source of current supply 46 may be used for the circuit extending through the movable coil 16, and for the purpose of measuring the current in this circuit we provide a suitably calibrated ammeter 47. One lead 48 of the latter is connected with the terminal 29' and the other lead 49 is connected with one side 50 of the source of current. So that our instrument may be entirely removable from the particular machine with which it is employed, we provide the auxiliary terminal 32 which serves as a means for connecting the leads 49 and 50 with the meter.

The generator 34 is in the illustrated embodiment assumed to operate under a balanced load and the three power lines 50', 51, and 52 extend to such load. For the purpose of producing a torque upon the spindle 10 proportional to the power output of the generator, we have arranged to pass a current through the movable coil 13 proportional to voltage, and a current through the corresponding stationary coil proportional to current. In the illustrated embodiment, the terminal 15' is connected by means of a lead 53 with the power line 50' and the terminal 14' is connected by means of the lead 54 to a neutral point 55, which is in this case artificially produced. The resistance 56 diagrammatically shown in the lead 54 may or may not actually exist, this resistance representing the resistance of the coil 13. The neutral point 55 is produced by connecting the power line 51 thereto by means of the lead 57 and by connecting the power line 52 thereto by means of the lead 58. A resistance 59 is actually inserted in the lead 57 and an equal resistance 60 is inserted in the lead 58. Each of the resistances 59 and 60 is equal to the resistance 56.

The current which is passed through the stationary coil is drawn from the power line 50' by means of the current transformer 61, the leads 62 and 63 leading respectively to the terminals 21' and 22'.

The arrangement as illustrated will cause the movable coil 13 to coact with its stationary coil to produce a torque upon the spindle 10 proportional to the power output of the generator 34. At the same time, a counter-torque will be produced by the coaction of the movable coil 16 and its stationary coil. The current passing through the stationary coil is proportional to the steam flow in the pipe 35. The current passing through the movable coil 16 will be constantly in a state of automatic control, whereby the two countertorques will be equal, and whereby the spindle 10 will be constantly at a period of approximate rest, with perhaps slight fluctuations in one or the other direction. The measurement of the varying current is made by means of the ammeter 47, and as previously pointed out, a proper calibration of this ammeter will serve to register the desired ratio constantly and directly.

We wish to point out that the angular position of the spindle 10 will under certain circumstances constantly serve as a measure of the same desired ratio. Under such circumstances, a pointer might be associated with the spindle 10, as at one end thereof, and the position of this pointer over a dial or the like, might be employed for recording the desired ratio.

We prefer the arrangement illustrated, for various reasons. In the first place, the angular position of the spindle will not under all circumstances be a correct measure, whereas the ammeters reading will always be correct. In the second place, it is preferable to design the instrument so that the spindle 10 will not have a very wide range of movement, and accordingly, a pointer and dial reading would not be as satisfactory as a current reading. In the third place, the employment of an instrument such as the ammeter 47 permits of remote reading or recording of the desired ratio.

The wide applicability of our invention and the varied uses of our device will be obvious upon a full understanding thereof and it need hardly be repeated that the specific turbo-generator of Figure 2 is but an illustration serving to exemplify and explain the invention.

It might be noted in passing that an ammeter inserted in the circuit of the fixed coil 23—24 would serve to give a reading of factor #2, in this case rate of steam consumption.

It will be obvious that changes in the details herein described and illustrated for the purpose of explaining the nature of our invention may be made by those skilled in the art without departing from the spirit and scope of the invention as expressed in the appended claims. It is therefore intended that these details be interpreted as illustrative, and not in a limiting sense.

Having thus described our invention and illustrated its use, what we claim as new and desire to secure by Letters Patent is—

1. The herein described method of measuring the ratio between two variable factors of operation of a machine, which consists in exerting upon a movable member a force proportional to one of said factors, exerting upon said member a counter-force proportional to the product of the other factor, and a supply of electric energy, and then varying said energy to equalize said forces, whereby said energy thereupon becomes a measure of the ratio between said second factor and said first force, hence of the ratio desired.

2. In a meter for measuring the ratio between two variable factors of operation of a machine, a movable member, means for exerting upon said member a force proportional to one of said factors, a supply of electrical current, means for exerting upon said member a counter-force proportional to the product of the other factor and said current, said last-named means including an inductance coil through which said current flows, means automatically operable by said member for varying said current to equalize said forces, and means for measuring said current after said equalization has been established.

3. In a meter for measuring the ratio between two variable factors of operation of a machine, a movable member, means for exerting upon said member a force proportional to one of said factors, a supply of electric energy, means for exerting upon said member a counter-force proportional to the product of the other factor and said energy; and electrical means automatically operable by said member for varying said energy to equalize said forces.

4. In a meter for measuring the ratio between two variable factors of operation of a machine, a rotatable member, means for exerting upon said member a torque proportional to one of said factors, a supply of electric energy, means for exerting upon said member a counter-torque proportional to the product of the other factor and said energy; and an electrical rheostat automatically operable by said member for varying said energy to equalize said forces.

5. In a meter for measuring the ratio between two variable factors of operation of a machine, a movable member, means for exerting upon said member a force proportional to one of said factors, a supply of electrical current, means for exerting upon said member a counter-force proportional to the product of the other factor and said current, said last-named means including an inductance coil through which said current flows, and a rheostat automatically operable by said member for varying said current to equalize said forces, whereby said current will be a measure of the ratio desired.

6. In a meter for measuring the ratio between two variable factors of operation of a machine, a movable member, means for exerting upon said member a force proportional to one of said factors, a supply of electrical current, an electric circuit, means for establishing a current in said circuit proportional to the other factor, means for exerting upon said member a counter-force proportional to the product of said currents, and means for varying said first-named current supply to equalize said forces.

7. In a meter for measuring the ratio between two variable factors of operation of a machine, a movable member, means for exerting upon said member a force proportional to one of said factors, a supply of electrical current, an electric circuit, means for establishing a current in said circuit proportional to the other factor, means for exerting upon said member a counter-force proportional to the product of said currents, said last-named means comprising a pair of cooperable inductance coils through which said currents flow, and means for varying said first-named current supply to equalize said forces.

8. In a meter for measuring the ratio between two variable factors of operation of a machine, a movable member, means for exerting upon said member a force proportional to one of said factors, a supply of electrical current, an electric circuit, means for establishing a current in said circuit proportional to the other factor, means for exerting upon said member a counter-force proportional to the product of said currents, and means automatically operable by said member for varying said first-named current supply to equalize said forces.

9. In a meter for measuring the ratio between two variable factors of operation of a machine, a rotatable member, means for exerting upon said member a torque proportional to one of said factors, a supply of electrical current, an electric circuit, means for establishing a current in said circuit proportional to the other factor, means for exerting upon said member a counter-torque proportional to the product of said currents, said last-named means comprising a pair of cooperably arranged inductance coils through which said currents flow, and electrical means automatically operable by said member for varying said first-named current supply to equalize said torques.

10. An electric measuring instrument comprising a movable member; two pairs of coactively arranged inductance coils, each pair having one coil fixed and the other mounted on said member; means for passing an electric current through one of said coils and for passing other electric currents through the remaining coils so that counter-forces will be exerted upon said member; and means for varying said first-named current to equalize said forces; whereby said first-named current will always be proportional to a predetermined algebraic function of said other currents when said equality is established.

11. An electric measuring instrument comprising a rotatable spindle; two pairs of coactively arranged inductance coils, each pair having one coil fixed and the other mounted on said spindle; means for passing an electric current through one of said coils and for passing other electric currents through the remaining coils so that counter-torques will be exerted upon said spindle; and means for varying said first-named current to equalize said forces; whereby said first-named current will always be proportional to a predetermined algebraic function of said other currents when said equality is established.

12. An electric measuring instrument comprising a movable member; two pairs of coactively arranged inductance coils, each pair having one coil fixed and the other mounted on said member; means for passing an electric current through one of said coils and for passing other electric currents through the remaining coils so that counter-forces will be exerted upon said member; and means automatically operable by said member for varying said first-named current to equalize said forces; whereby said first-named current will always be proportional to a predetermined algebraic function of said other currents when said equality is thus automatically established.

13. An electric measuring instrument comprising a rotatable spindle; two pairs of coactively arranged inductance coils, each pair having one coil fixed and the other mounted on said spindle; means for passing an electric current through one of said coils and for passing other electric currents through the remaining coils so that counter-torques will be exerted upon said spindle; and means automatically operable by said spindle for varying said first-named current to equalize said torques; whereby said first-named current will always be proportional to a predetermined algebraic function of said other currents when said equality is thus automatically established.

In witness whereof we have signed this specification this 9 day of January, 1929.

SIDNEY HAUSMAN.
WALTER VEIT.